US010770738B2

(12) United States Patent
Yoshida (10) Patent No.: US 10,770,738 B2
(45) Date of Patent: Sep. 8, 2020

(54) VEHICLE WITH FUEL CELL SYSTEM MOUNTED THEREON

(71) Applicant: TOYOTA JIDOSHA KABUSHIKI KAISHA, Toyota-shi, Aichi-ken (JP)

(72) Inventor: Naohiro Yoshida, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 105 days.

(21) Appl. No.: 15/957,191

(22) Filed: Apr. 19, 2018

(65) Prior Publication Data

US 2018/0309146 A1 Oct. 25, 2018

(30) Foreign Application Priority Data

Apr. 25, 2017 (JP) .................................. 2017-085956

(51) Int. Cl.

| H01M 8/04537 | (2016.01) |
|---|---|
| H01M 8/04302 | (2016.01) |
| H01M 8/04089 | (2016.01) |
| H01M 8/04225 | (2016.01) |
| H01M 8/04082 | (2016.01) |
| H01M 8/247 | (2016.01) |

(52) U.S. Cl.
CPC ... *H01M 8/04559* (2013.01); *H01M 8/04089* (2013.01); *H01M 8/04201* (2013.01); *H01M 8/04225* (2016.02); *H01M 8/04302* (2016.02); *H01M 8/247* (2013.01); *H01M 2250/20* (2013.01); *Y02T 90/32* (2013.01)

(58) Field of Classification Search
None
See application file for complete search history.

(56) References Cited

FOREIGN PATENT DOCUMENTS

| JP | 09022711 A | * | 1/1997 |
|---|---|---|---|
| JP | 2006-120363 | | 5/2006 |
| JP | 2006120363 A | * | 5/2006 |
| JP | 2008-223784 A | | 9/2008 |

* cited by examiner

*Primary Examiner* — Daniel S Gatewood
(74) *Attorney, Agent, or Firm* — Finnegan, Henderson, Farabow, Garrett & Dunner, LLP (57) ABSTRACT

Disclosed is a vehicle with a fuel cell system mounted thereon, the fuel cell system including: a fuel cell; a plurality of tanks for storing therein fuel gas to be used for power generation of the fuel cell, each tank having an opening/closing valve for switching over between execution and halt of supply of the fuel gas; a plurality of supply flow paths connected to the opening/closing valves in the plurality of tanks to feed the fuel gas supplied from the plurality of tanks, respectively; a merging flow path for merging together the plurality of supply flow paths to feed the fuel gas to the fuel cell; and a controller for controlling opening and closing of the opening/closing valves. The merging flow path is fastened to a vehicle body of the vehicle, and at a start-up of the fuel cell system, the controller exerts such control as to open an opening/closing valve that is longest in total length out of the opening/closing valves in the plurality of tanks, the total length being a total sum of lengths of the merging flow path and the relevant supply flow path located within a range from a fastening position, at which the merging flow path is fastened to the vehicle body, to each opening/closing valve. Thus, it becomes possible to suppress the possibility that noise caused by vibrations due to discharge of hydrogen gas may be recognized by a passenger of the vehicle.

3 Claims, 7 Drawing Sheets

VEHICLE WITH FUEL CELL SYSTEM MOUNTED THEREON

CROSS-REFERENCE TO RELATED APPLICATIONS

The present application claims priority from Japanese patent application 2017-085956 filed on Apr. 25, 2017, the entirety of the content of which is hereby incorporated by reference into this application.

BACKGROUND

Field

The present disclosure relates to a vehicle with a fuel cell system mounted thereon.

Related Art

Among fuel cell systems is one including: a fuel cell; a plurality of tanks which store fuel gas to be used for power generation by the fuel cell and which have opening/closing valves, respectively, for switching over between execution and halt of fuel gas supply; a plurality of supply flow paths connected to the opening/closing valves to feed the fuel gas; and a merging flow path for merging the plural supply flow paths together to feed the fuel gas to the fuel cell.

In a vehicle with the fuel cell system of JP 2006-120363 A mounted thereon, however, on condition that the merging flow path is fastened to the vehicle body, there is a problem that upon opening the opening/closing valve of a tank, vibrations due to discharge of the fuel gas compressed in the tank would be transferred via the merging flow path to the vehicle body so as to be perceived as noise for a vehicle passenger. This noise, when perceived by the passenger, causes a fear that the passenger's mental image of the vehicle may be degraded. For a solution to this and other problems, a technique is desired which is capable of suppressing the possibility that noise occurring from vibrations due to discharge of the fuel gas compressed in tanks may be perceived by passengers of the vehicle.

SUMMARY

In one aspect of the present disclosure, there is provided a vehicle with a fuel cell system mounted thereon. The fuel cell system includes: a fuel cell; a plurality of tanks for storing therein fuel gas to be used for power generation of the fuel cell, each tank having an opening/closing valve for switching over between execution and halt of supply of the fuel gas; a plurality of supply flow paths connected to the opening/closing valves in the plurality of tanks to feed the fuel gas supplied from the plurality of tanks, respectively; a merging flow path for merging together the plurality of supply flow paths to feed the fuel gas to the fuel cell; and a controller for controlling opening and closing of the opening/closing valves, wherein the merging flow path is fastened to a vehicle body of the vehicle, and at a start-up of the fuel cell system, the controller exerts such control as to open an opening/closing valve that is longest in total length out of the opening/closing valves in the plurality of tanks, the total length being a total sum of lengths of the merging flow path and the relevant supply flow path located within a range from a fastening position, at which the merging flow path is fastened to the vehicle body, to each opening/closing valve.

DETAILED DESCRIPTION

A. First Embodiment

Figure 1:
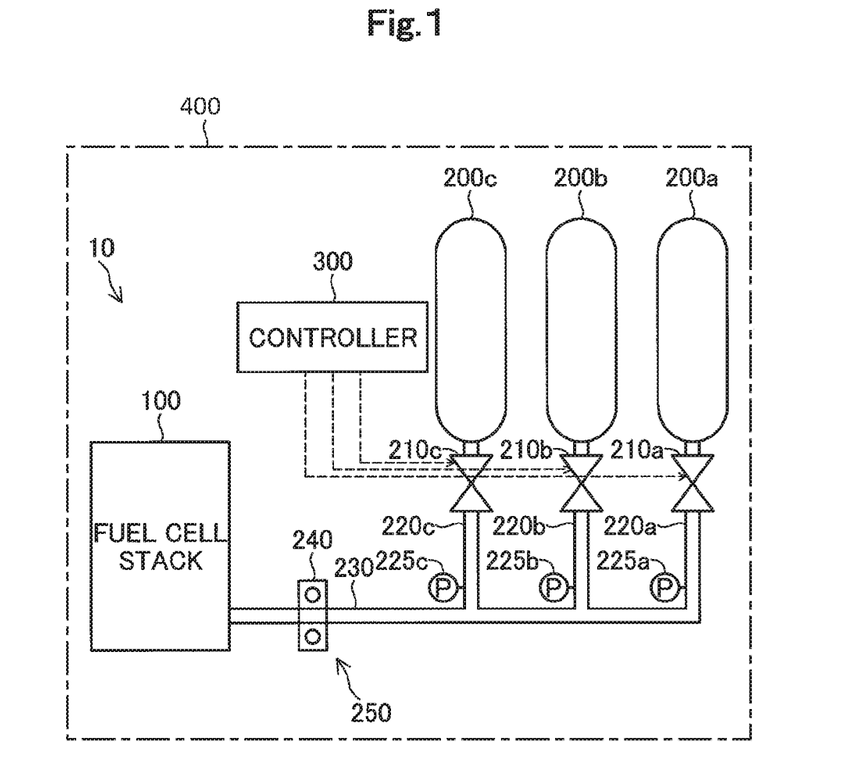
FIG. 1 is a block diagram showing a configuration of a fuel cell system.

FIG. 1 is a block diagram showing a configuration of a fuel cell system 10 in a first embodiment of the present disclosure. The fuel cell system 10 is mounted on a motor-driven vehicle as a power source of the vehicle. The fuel cell system 10 includes a fuel cell stack 100, tanks 200a, 200b, 200c, supply flow paths 220a, 220b, 220c, a merging flow path 230, a fastening part 240, and a controller 300. Hereinbelow, the three tanks, when generically referred to, will be designated by using sign '200,' and the three supply flow paths, when generically referred to, will be designated by using sign '220.'

The fuel cell stack 100 has a stack structure in which a plurality of unit cells are stacked in layers. Each unit cell is so structured that a membrane electrode assembly made by joining an anode and a cathode to both sides, respectively, of an electrolyte membrane having proton conductivity is held between separators. The fuel cell stack 100 is supplied with hydrogen gas and air to perform power generation through electrochemical reactions of hydrogen and oxygen.

The tank 200a stores hydrogen gas as a fuel gas to be used for power generation of the fuel cell stack 100. The tank 200a has an opening/closing valve 210a. The opening/closing valve 210a switches over between execution and halt of hydrogen gas supply from the tank 200a. Tanks 200b and 200c, which are similar in structure to the tank 200a, have their corresponding opening/closing valves 210b and 210c, respectively. Hereinbelow, the three opening/closing valves, when generically referred to, will be designated by using sign '210.'

The supply flow path 220a connects with the opening/closing valve 210a to feed hydrogen gas supplied from the tank 200a toward the merging flow path 230. A pressure sensor 225a is provided on the supply flow path 220a. The pressure sensor 225a measures internal pressure of the supply flow path 220a. The internal pressure of the supply flow path 220a to be measured by the pressure sensor 225a under an opened state of the opening/closing valve 210a may be regarded as hydrogen-gas pressure in the tank 200a. The supply flow path 220b and the supply flow path 220c connect with the opening/closing valve 210b and the opening/closing valve 210c, respectively, to feed hydrogen gas supplied from the tank 200b and the tank 200c, respectively, toward the merging flow path 230. A pressure sensor 225b and a pressure sensor 225c are provided on the supply flow path 220b and the supply flow path 220c, correspondingly and respectively. Hereinbelow, the three pressure sensors, when generically referred to, will be designated by using sign '225.'

The merging flow path 230 is a flow path into which the supply flow path 220a, the supply flow path 220b and the supply flow path 220c are merged together. The merging flow path 230 serves to feed hydrogen gas, which is supplied via the supply flow path 220a, the supply flow path 220b and the supply flow path 220c, to the fuel cell stack 100.

The fastening part 240 fastens the merging flow path 230 to a vehicle body 400 of a vehicle with the fuel cell system 10 mounted thereon at a fastening position 250. The fastening part 240 may be made up of a bracket and a bolt as an example, and the bracket holding the merging flow path 230 may be fastened to the vehicle body 400 with the bolt so that the merging flow path 230 is fastened to the vehicle body 400.

The controller 300 receives signals outputted from various types of unshown sensors included in the fuel cell system 10, and controls operations of individual parts of the fuel cell system 10. For example, the controller 300 receives, from the pressure sensors 225, signals indicative of measured values measured by the pressure sensors 225. The controller 300 also controls, for example, opening/closing of the opening/closing valve 210a, the opening/closing valve 210b and the opening/closing valve 210c. The controller 300 may be implemented by an ECU (Electronic Control Unit).

Figure 2:
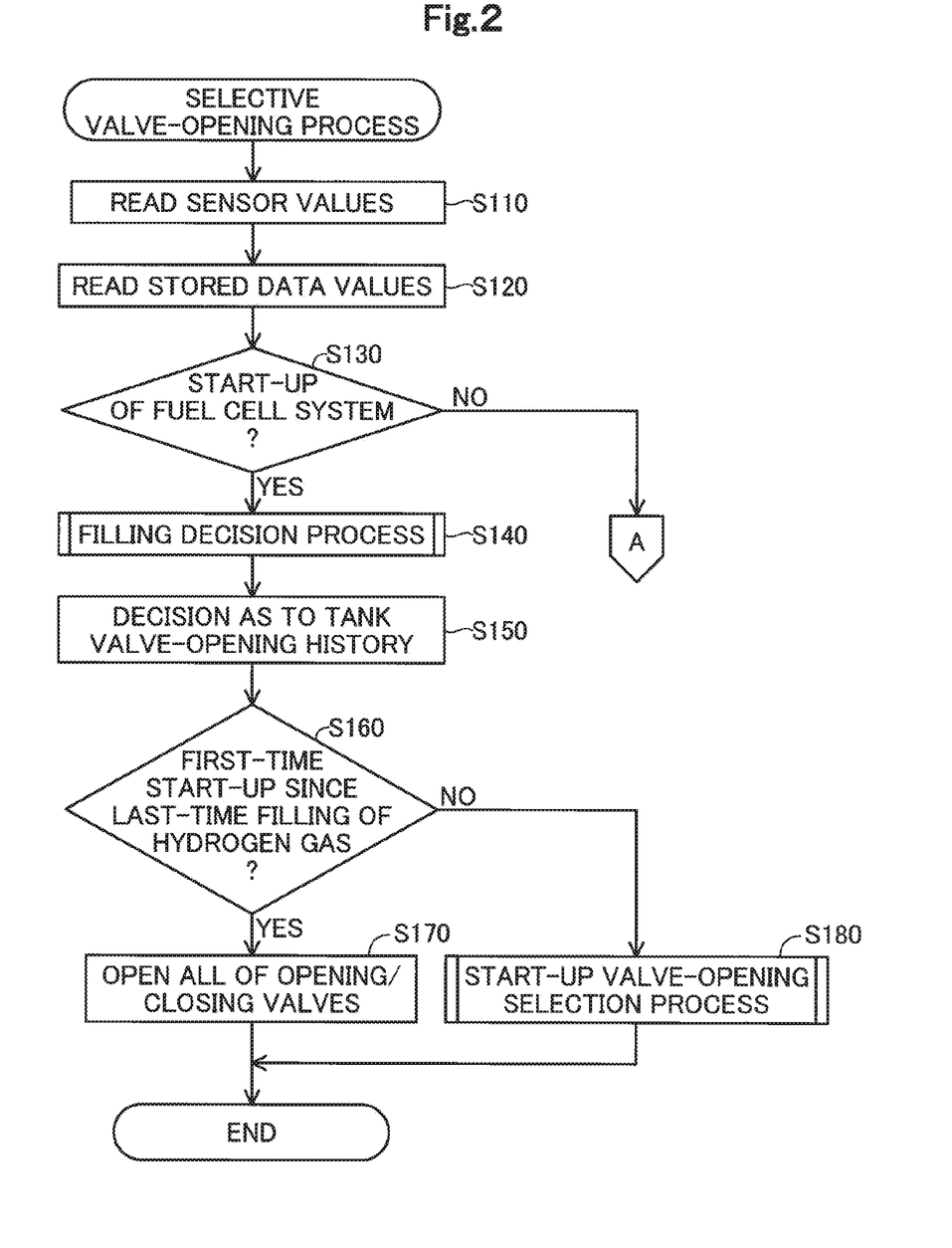
FIG. 2 is a flowchart showing a selective valve-opening process to be executed by a controller.
Figure 3:
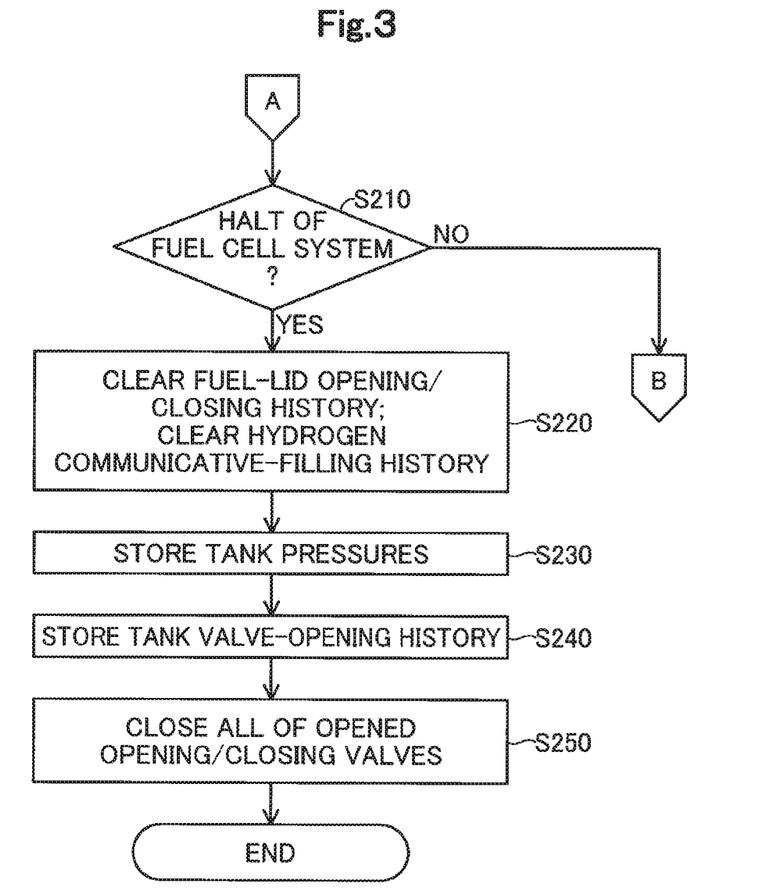
FIG. 3 is a flowchart showing a selective valve-opening process to be executed by the controller.
Figure 4:
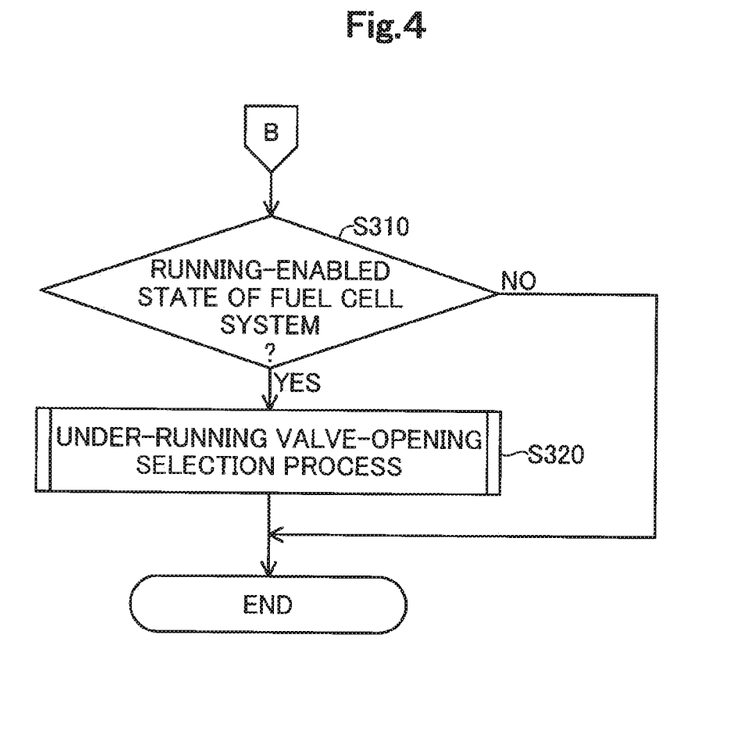
FIG. 4 is a flowchart showing a selective valve-opening process to be executed by the controller.

FIGS. 2, 3 and 4 are flowcharts showing a selective valve-opening process to be executed by the controller 300. The selective valve-opening process is started along with a start-up of the fuel cell system 10, and repeatedly executed while the fuel cell system 10 is under operation. The fuel cell system 10 is started when an ignition switch provided in the vehicle with the fuel cell system 10 mounted thereon is turned on. It is noted that with the fuel cell system 10 at a halt, the opening/closing valve 210a, the opening/closing valve 210b and the opening/closing valve 210c are closed.

As shown in FIG. 2, the controller 300 reads sensor values, as well as signals, measured by the various sensors provided in the fuel cell system 10 (step S110). The sensor values and signals to be read at step S110 include a value indicative of a current internal pressure of a tank 200, a value indicative of an electric power generated by the fuel cell stack 100, a value indicative of a vehicle speed of the vehicle having the fuel cell system 10 mounted thereon, a signal indicative of a door-lock state of the vehicle having the fuel cell system 10 mounted thereon, a signal indicative whether a secondary battery provided in the vehicle having the fuel cell system 10 mounted thereon is under charging or not, and the like. The term, value indicative of a current internal pressure of a tank 200, herein refers to a value measured by the pressure sensor 225 in the tank 200 with the opening/closing valve 210 opened. In a tank 200 with the opening/closing valve 210 closed, the value differs depending on whether or not a filling of hydrogen gas has been conducted by way of communicative filling under a closed state of the opening/closing valve 210. The term, communicative filling, herein refers to a filling method by which hydrogen is filled into a tank 200 while infrared communication between the controller 300 and a hydrogen station is being executed. For a tank 200 which has undergone the filling of hydrogen gas under a closed state of the opening/closing valve 210, the pressure value refers to a value indicative of an internal pressure of the tank 200 acquired by the controller 300 during the communicative filling process. For a tank 200 which has undergone no filling of hydrogen gas under a closed state of the opening/closing valve 210, the pressure value refers to a value derived from a correction process in which a value measured by the pressure sensor 225 under the last-time opened state of the opening/closing valve 210 is corrected based on such conditions as temperature, coefficient of thermal expansion, hydrogen compressibility factor, sensor precision of the pressure sensor 225, and the like.

After the reading of sensor values (after step S110), the controller 300 reads stored data values stored in the controller 300 (step S120). The stored data values to be read at step S120 include start-up history of the fuel cell system 10, hydrogen-gas filling history, internal-pressure value history of the tanks 200, valve-opening count history of the opening/closing valves 210, and the like.

After the reading of stored data values (after step S120), the controller 300 decides whether or not the fuel cell system 10 is at a start-up (step S130). In this embodiment, on condition that the fuel cell stack 100 is not enabled to supply a predetermined electric power, the controller 300 decides that the fuel cell system 10 is at a start-up (YES at step S130). In this embodiment, on condition that the fuel cell stack 100 is enabled to supply the predetermined electric power, the controller 300 decides that the fuel cell system 10 is not at a start-up. In addition, on condition that the fuel cell system 10 is in a start-up state (YES at step S130), the opening/closing valve 210a, the opening/closing valve 210b and the opening/closing valve 210c are all in the closed state.

When it is decided that the fuel cell system 10 is at a start-up (YES at step S130), the controller 300 executes a filling decision process (step S140). In the filling decision process, it is decided whether or not a filling of hydrogen gas has been conducted for the tanks 200 under a halted state of the fuel cell system 10. In this embodiment, when it is decided that the fuel cell system 10 is at a start-up (YES at step S130), the controller 300 updates start-up history of the fuel cell system 10.

Figure 5:
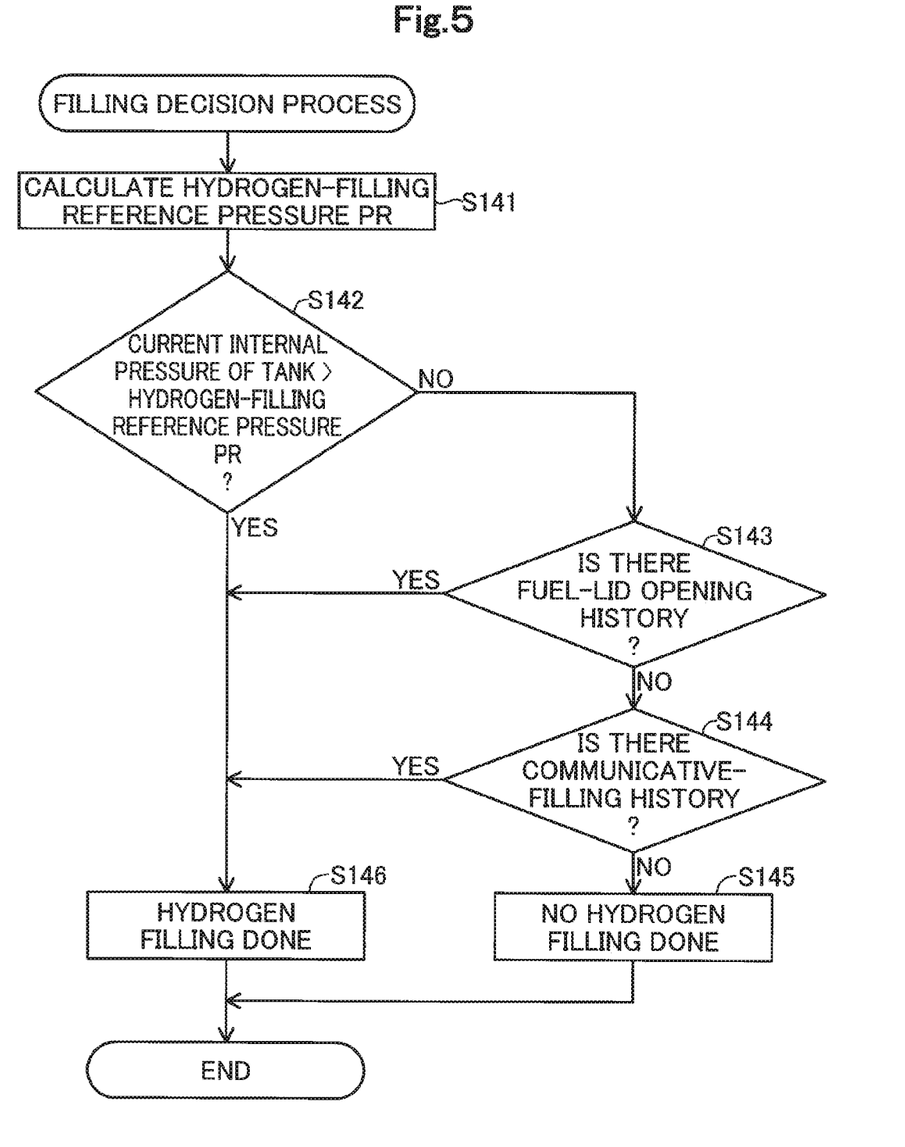
FIG. 5 is a flowchart showing a filling decision process to be executed by the controller.

FIG. 5 is a flowchart showing a filling decision process to be executed by the controller 300. The controller 300 calculates a hydrogen-filling reference pressure PR indicative of an internal-pressure value of a tank 200 under a last-time halted state of the fuel cell system 10 (step S141). The term, hydrogen-filling reference pressure PR, refers to a value derived from a correction process in which a value measured by the pressure sensor 225 under the last-time opened state of the opening/closing valve 210 is corrected based on such conditions as temperature, coefficient of thermal expansion, hydrogen compressibility factor, sensor precision of the pressure sensor 225, and the like.

After the execution of calculation of the hydrogen-filling reference pressure PR (after step S141), the controller 300 decides whether or not a current internal pressure of a tank 200 is larger than the hydrogen-filling reference pressure PR (step S142). The term, current internal pressure of a tank 200, herein refers to a value indicative of an internal pressure of a tank 200 read at step S110. In this embodiment, the pressure of a tank 200 to be compared with the hydrogen-filling reference pressure PR is a pressure of the tank 200a out of the tanks 200. Instead of the pressure of the tank 200a or in addition to the pressure of the tank 200a, at least one of pressures of the tank 200b and the tank 200c may be adopted as the pressure of a tank 200 to be compared with the hydrogen-filling reference pressure PR for decision making.

When it is decided that the current internal pressure of the tank 200 is not larger than the hydrogen-filling reference pressure PR (NO at step S142), the controller 300 decides whether or not there is a history of opening of a fuel lid (not shown) provided in the vehicle with the fuel cell system 10 mounted thereon (step S143). Among cases in which the current internal pressure of the tank 200 is decided to be not larger than the hydrogen-filling reference pressure PR is a case as follows, for example. That is, given that the current internal pressure of the tank 200 is a value of a tank 200 whose opening/closing valve 210 is closed and which has not undergone a filling of hydrogen gas under a closed state of the opening/closing valve 210, the current internal pressure of the tank 200 and the hydrogen-filling reference pressure PR become equal to each other.

When it is decided that there is no history of the fuel lid's having been opened (NO at step S143), the controller 300 decides whether or not there is a history of a communicative filling (step S144). When it is decided that there is no history of communicative filling (NO at step S144), the controller 300 decides that there has been no filling of hydrogen gas into the tank 200 (step S145). Thereafter, the controller 300 ends the filling decision process.

When it is decided that the current internal pressure of the tank 200 is larger than the hydrogen-filling reference pressure PR (YES at step S142), or when it is decided that there is a history of the fuel lid's having been opened (YES at step S143), or when it is decided that there is a history of a communicative filling (YES at step S144), the controller 300 decides that there has been a filling of hydrogen gas into the tank 200 (step S146). In this case, the controller 300 updates the hydrogen-gas filling history. Thereafter, the controller 300 ends the filling decision process.

Reverting to FIG. 2, after the execution of the filling decision process (after step S140), the controller 300 executes a tank valve-opening history decision for deciding a valve-opening count of an opening/closing valve 210 resulting since the last-time decision that a hydrogen-gas filling has been done, based on the history indicative of the valve-opening count of the opening/closing valve 210 read at step S120 (step S150).

After the execution of the tank valve-opening history decision (after step S150), based on the start-up history of the fuel cell system 10 and the hydrogen-gas filling history, the controller 300 decides whether or not the start-up of the fuel cell system 10 is a first-time start-up since the last-time filling of hydrogen gas into the tanks 200 (step S160).

When it is decided that the start-up of the fuel cell system 10 is a first-time start-up since the last-time filling of hydrogen gas into the tanks 200 (YES at step S160), the controller 300 makes all the opening/closing valves in the fuel cell system 10 opened (step S170). In this embodiment, all of the opening/closing valve 210a, the opening/closing valve 210b and the opening/closing valve 210c are opened. Thereafter, the controller 300 ends the selective valve-opening process. Doing in this way makes it possible to suppress damage to the opening/closing valves. This will be explained in detail below. When a start-up of the fuel cell system 10 is a first-time start-up since the last-time filling of hydrogen gas into the tanks 200, it is highly likely that the tanks 200 have come to a high-pressure state due to the hydrogen-gas filling. In such a state, opening an opening/closing valve 210 or opening/closing valves 210 of some of the tanks 200 gives rise to a possibility that a closed opening/closing valve 210 sandwiched between hydrogen gas discharged from within a high-pressure tank 200 and high-pressure hydrogen gas filled within the closed tank 200 may be damaged. Accordingly, such damage to the opening/closing valves 210 can be suppressed by opening all the opening/closing valves 210 at a first-time start-up.

When it is decided that the start-up of the fuel cell system 10 is not a first-time start-up since the last-time filling of hydrogen gas into the tanks 200 (NO at step S160), the controller 300 executes a start-up valve-opening selection process (step S180).

Figure 6:
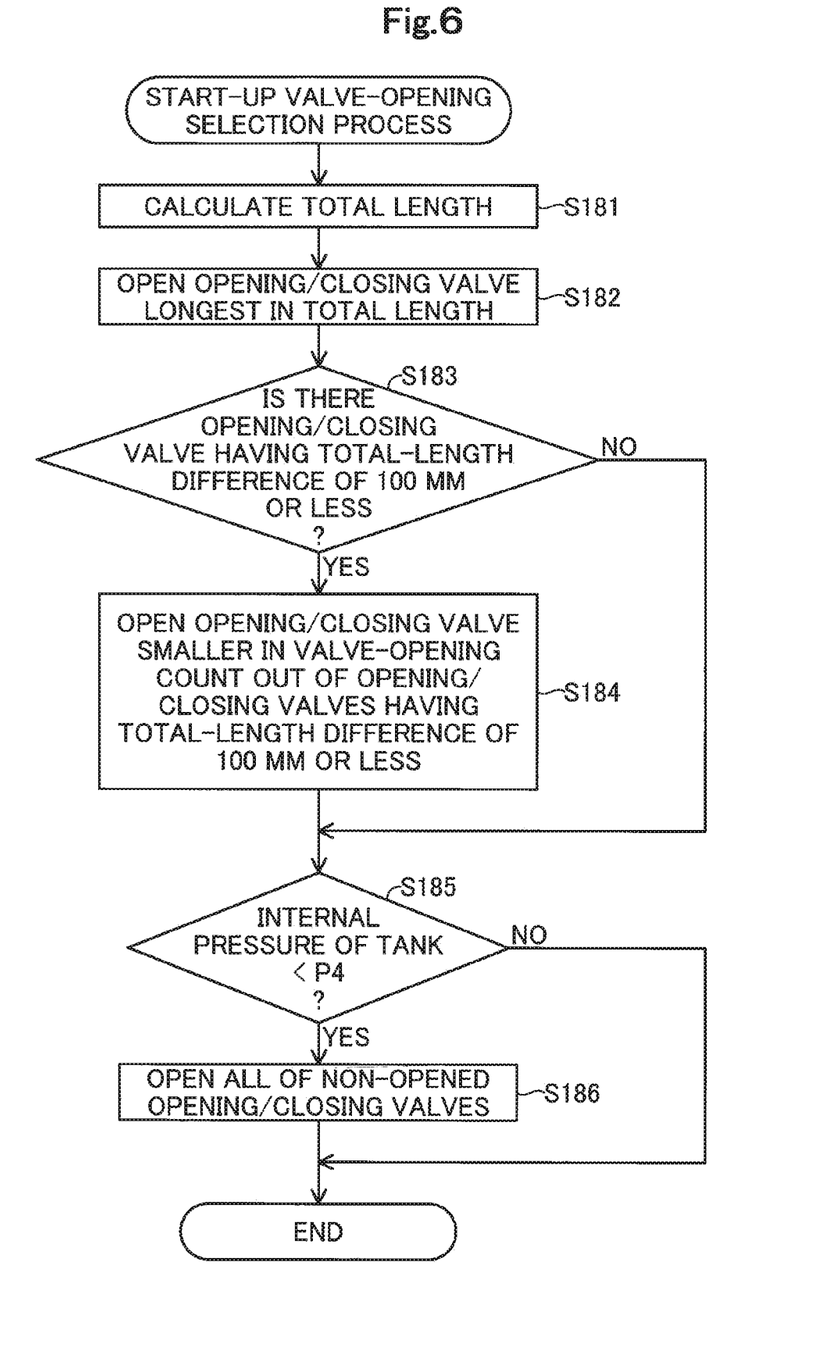
FIG. 6 is a flowchart showing a start-up valve-opening selection process to be executed by the controller.

FIG. 6 is a flowchart showing a start-up valve-opening selection process to be executed by the controller 300. The controller 300 calculates a total length of the merging flow path 230 and the supply flow path 220 present within a range from the fastening position 250 of the fastening part 240 to the opening/closing valve 210 (step S181). The term, total length, means a summed-up length of the merging flow path 230 and the supply flow path 220, which interconnects the fastening part 240 and an opening/closing valve 210. In this embodiment, as shown in FIG. 1, the total length to the opening/closing valve 210a is the longest, the total length to the opening/closing valve 210b is the second longest, and the total length to the opening/closing valve 210c is the third longest. In this embodiment, values of the total lengths for the three opening/closing valves 210 have previously been stored in the controller 300.

After calculation of the total length (after step S181), the controller 300 opens the opening/closing valve having the longest total length (step S182).

After opening of the opening/closing valve 210 having the longest total length (after step S182), the controller 300 decides whether or not there exists an opening/closing valve 210 (hereinafter, referred to as 'candidate opening/closing valve') whose total-length difference from an opening/closing valve 210 having the longest total length out of non-opened opening/closing valves 210 is 100 mm or less (step S183).

When there exists a candidate opening/closing valve (YES at step S183), the controller 300 makes the candidate opening/closing valve opened. When it is decided at step S183 that there exist plural candidate opening/closing valves, a candidate opening/closing valve having the smaller valve-opening count is opened (step S184). The decision as to the valve-opening count is made based on valve-opening counts of the candidate opening/closing valves since the last-time decision at step S150 that a filling of hydrogen gas has been conducted. When there exist candidate opening/closing valves of the same valve-opening count, valve opening is executed in a previously set order among candidate opening/closing valves. For example, the valve opening is done in an order starting with a candidate opening/closing valve having the longer total length out of the candidate opening/closing valves.

When there exist no candidate opening/closing valves (NO at step S183) or after the candidate opening/closing valve is opened (after step S184), the controller 300 decides whether or not internal pressures of all of tanks 200 having non-opened opening/closing valves 210, respectively, are smaller than a predetermined pressure value P4 (step S185). The term, predetermined pressure value P4, herein refers to a value indicative of an upper limit of the internal pressure of a tank 200 at which noise caused by vibrations due to discharge of hydrogen gas compressed in the tank 200 is not perceived by a passenger of the vehicle having the fuel cell system 10 mounted thereon. The term, internal pressure of a tank 200 to be used in step S185, herein refers to a value indicative of a current internal pressure of a tank 200 read at step S110.

When it is decided that internal pressures of all the tanks 200 having non-opened opening/closing valves 210, respectively, are smaller than the predetermined pressure value P4 (YES at step S185), the controller 300 opens all the non-opened opening/closing valves 210 (step S186). Doing so makes it possible to reduce pressure differences among the tanks 200. Thereafter, the controller 300 ends the start-up valve-opening selection process.

When it is decided that internal pressure of at least one or more tanks 200 out of the tanks 200 having non-opened opening/closing valves 210, respectively, are not smaller than the predetermined pressure value P4 (NO at step S185), the controller 300 ends the start-up valve-opening selection process.

Reverting to FIG. 2, after the execution of the start-up valve-opening selection process (after step S180), the controller 300 ends the selective valve-opening process.

FIG. 3 is a flowchart showing a process to be executed by the controller 300 when it is decided that the fuel cell system 10 is not at a start-up (NO at step S130 in FIG. 2). When it is decided that the fuel cell system 10 is not at a start-up (NO at step S130), the controller 300 decides whether or not the fuel cell system 10 is at a halt (step S210). In this embodiment, when the ignition switch provided in the vehicle having the fuel cell system 10 mounted thereon is turned off, the controller 300 decides that the fuel cell system 10 is at a halt (YES at step S210).

When it is decided that the fuel cell system 10 is at a halt (YES at step S210), the controller 300 clears various types of histories (step S220). Included in the histories to be cleared in step S220 are a fuel-lid opening/closing history showing whether or not the fuel lid has been opened, and a hydrogen communicative-filling history showing whether or not there exists a history of hydrogen-gas communicative filling.

After the clearing of various histories (after step S220), the controller 300 stores an internal pressure of a tank 200 obtained at a halt of the fuel cell system 10 (step S230). In step S230, the controller 300 updates and stores the history of internal-pressure values of the tank 200.

After the storage of internal pressures of the tanks 200 (after step S230), the controller 300 stores histories indicative of valve-opening counts of opening/closing valves 210 (step S240). In step S240, the controller 300 updates and stores the histories indicative of valve-opening counts of opening/closing valves 210 by using the valve-opening counts of the opening/closing valves 210 that have been opened since a start-up of the fuel cell system 10 until a halt thereof.

After the storage of histories indicative of valve-opening counts of the opening/closing valves 210 (after step S240), the controller 300 makes all the opened opening/closing valves 210 closed (step S250). After making all the opened opening/closing valves 210 closed, the controller 300 ends the selective valve-opening process.

FIG. 4 is a flowchart showing a process to be executed by the controller 300 when it is decided that the fuel cell system 10 is not at a halt (NO at step S210 in FIG. 3). When it is decided that the fuel cell system 10 is not at a halt (NO at step S210), the controller 300 decides whether or not the vehicle having the fuel cell system 10 mounted thereon is in a running-enabled state (step S310). In this embodiment, when the fuel cell stack 100 is enabled to supply a predetermined electric power, the controller 300 decides that the vehicle having the fuel cell system 10 mounted thereon is in a running-enabled state.

When it is decided that the vehicle having the fuel cell system 10 mounted thereon is not in a running-enabled state (NO at step S310), the controller 300 ends the selective valve-opening process. In this case, the fuel cell system 10 is in an under-maintenance state.

When it is decided that the vehicle having the fuel cell system 10 mounted thereon is in a running-enabled state (YES at step S310), the controller 300 executes an under-running valve-opening selection process (step S320).

Figure 7:
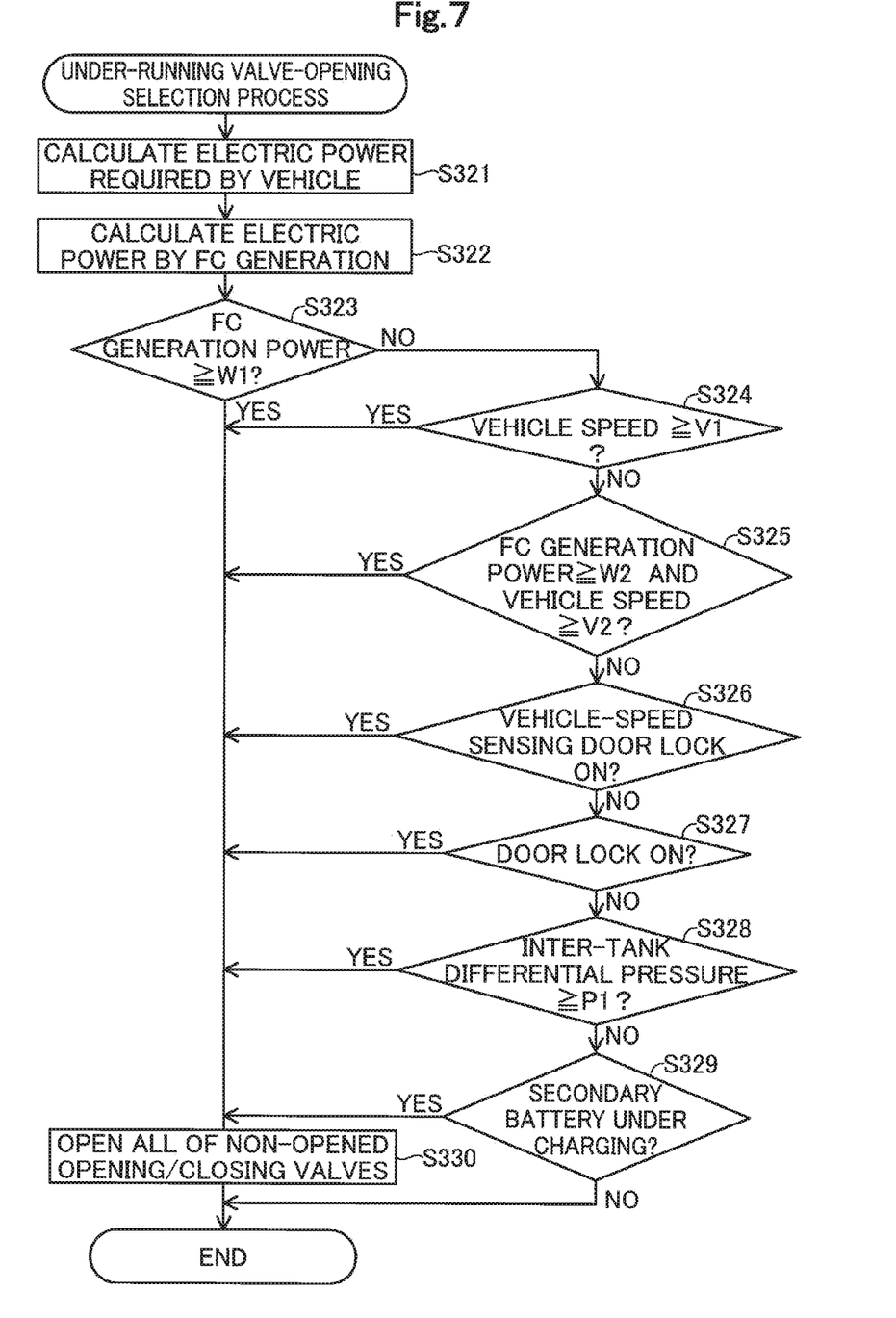
FIG. 7 is a flowchart showing an under-running valve-opening selection process to be executed by the controller.

FIG. 7 is a flowchart showing an under-running valve-opening selection process to be executed by the controller 300. The controller 300 calculates a required electric power of the vehicle having the fuel cell system 10 mounted thereon (step S321). The required electric power of the vehicle refers to, for example, supply electric power to an unshown drive motor, supply electric power to auxiliary machines, supply electric power to an air-conditioning heater, and the like.

After the electric power required by the vehicle is calculated (after step S321), the controller 300 calculates, based on the required electric power of the vehicle, an electric power to be generated by the fuel cell stack 100 (step S322).

After calculating the electric power to be generated by the fuel cell stack 100 (after step S322), the controller 300 decides whether or not electric power generated by the fuel cell stack 100 is equal to or more than a predetermined power value W1 (step S323). The term, predetermined power value W1, herein refers to a value indicating a lower limit of power value that enables auxiliary machines to generate enough sound to counteract noise caused by vibrations due to hydrogen gas discharged from a tank 200 having a pressure value P4 or more as an internal pressure of the tank 200. Such a power value W1 is determined and set preparatorily by experiments. The term, auxiliary machines, herein refers to those which operate to make the fuel cell stack 100 generate electric power, their examples including an air compressor and the like. Increasing the electric power generated by the fuel cell stack 100, with an air compressor involved as an example, necessitates increasing the rotating speed of the air compressor, so that operating noise of the air compressor is increased.

When the electric power generated by the fuel cell stack 100 is equal to or more than the predetermined power value W1 (YES at step S323), the controller 300 opens all of non-opened opening/closing valves 210 (step S330). Thereafter, the controller 300 ends the under-running valve-opening selection process. Opening the opening/closing valves 210 concurrently with operating noise of the auxiliary machines at step S330 makes it possible to counteract noise caused by vibrations due to discharge of hydrogen gas compressed within the tanks 200. Thus, it becomes possible to suppress the possibility that noise caused by vibrations due to discharge of hydrogen gas may be perceived by a passenger of the vehicle.

When the electric power generated by the fuel cell stack 100 is other than equal to or more than the predetermined power value W1 (NO at step S323), the controller 300 decides whether or not a vehicle speed of the vehicle having the fuel cell stack 100 mounted thereon is equal to or more than a predetermined vehicle speed value V1 (step S324). The term, predetermined vehicle speed value V1, herein refers to a value indicating a lower limit of vehicle speed value that enables generation of a sound, such as road noise and wind noise, that can counteract noise caused by vibrations due to hydrogen gas discharged from a tank 200 having a pressure value P4 or more as an internal pressure of the tank 200. The term, road noise, herein refers to a sound caused by friction between a road surface and the tire of the vehicle having the fuel cell system 10 mounted thereon. Such a vehicle speed value V1 is preparatorily determined and set by experiments.

When the vehicle speed of the vehicle having the fuel cell stack 100 mounted thereon is equal to or more than the predetermined vehicle speed value V1 (YES at step S324), the foregoing step S330 is executed. Thereafter, the controller 300 ends the under-running valve-opening selection process. Opening the opening/closing valves 210 concurrently with road noise or wind noise generated by the vehicle speed value V1 makes it possible to counteract noise caused by vibrations due to discharge of hydrogen gas compressed within the tanks 200. Thus, it becomes possible to suppress the possibility that noise caused by vibrations due to discharge of hydrogen gas may be perceived by a passenger of the vehicle.

When the vehicle speed of the vehicle having the fuel cell stack 100 mounted thereon is other than equal to or more than the predetermined vehicle speed value V1 (NO at step S324), the controller 300 decides whether or not the electric power generated by the fuel cell stack 100 is equal to or more than a predetermined power value W2 and, concurrently, the vehicle speed of the vehicle having the fuel cell stack 100 mounted thereon is equal to or more than a predetermined vehicle speed value V2 (step S325). The terms, predetermined power value W2 and vehicle speed value V2, herein refer to values indicating lower limits of power value and vehicle speed value in such combinations that a sound that can counteract noise caused by vibrations due to hydrogen gas discharged from a tank 200 having a pressure value P4 or more as an internal pressure of the tank 200 can be generated by combining together operating noise of the auxiliary machines with road noise and wind noise. Such power value W2 and vehicle speed value V2 are preparatorily determined and set by experiments.

When the electric power generated by the fuel cell stack 100 is equal to or more than the predetermined power value W2 and concurrently the vehicle speed of the vehicle having the fuel cell stack 100 mounted thereon is equal to or more than the predetermined vehicle speed value V2 (YES at step S325), the above-described step S330 executed. Thereafter, the controller 300 ends the under-running valve-opening selection process. Noise caused by vibrations due to discharge of hydrogen gas compressed in tanks 200 can be counteracted by opening the opening/closing valves 210 concurrently with operating noise of the auxiliary machines operative on the power value W2 as well as with road noise and wind noise generated by the vehicle speed value V2. Thus, it becomes possible to suppress the possibility that noise caused by vibrations due to discharge of hydrogen gas may be perceived by a passenger of the vehicle.

When the electric power generated by the fuel cell stack 100 is equal to or more than the predetermined power value W2 and moreover the vehicle speed of the vehicle having the fuel cell stack 100 mounted thereon is other than equal to or more than the predetermined vehicle speed value V2 (NO at step S325), the controller 300 decides whether or not a vehicle-speed sensing door lock capable of automatic door lock in linkage with vehicle speed is turned on (step S326). The wording "vehicle-speed sensing door lock is turned on" means that door lock is made when the vehicle having the fuel cell system 10 mounted thereon has exceeded a predetermined vehicle speed. In this embodiment, the predetermined vehicle speed is a speed per hour of 15 km/h.

When the vehicle-speed sensing door lock is turned on (YES at step S326), the above-described step S330 is executed. Thereafter, the controller 300 ends the under-running valve-opening selection process. Opening the opening/closing valves 210 concurrently with noise caused by turn-on of the vehicle-speed sensing door lock makes it possible to counteract the noise caused by vibrations due to discharge of hydrogen gas compressed within the tanks 200. Thus, it becomes possible to suppress the possibility that noise caused by vibrations due to discharge of hydrogen gas may be perceived by a passenger of the vehicle.

When the vehicle-speed sensing door lock is not turned on (NO at step S326), the controller 300 decides whether or not a door lock is turned on (step S327). The wording "a door lock is turned on" herein means that the door is clocked by door-lock operation made by a passenger of the vehicle having the fuel cell system 10 mounted thereon.

When the door lock is turned on (YES at step S327), the above-described step S330 is executed. Thereafter, the controller 300 ends the under-running valve-opening selection process. As in the above-described case where the vehicle-speed sensing door lock is turned on, opening the opening/closing valves 210 concurrently with noise caused by turn-on of the door lock made by a passenger of the vehicle makes it possible to counteract the noise caused by vibrations due to discharge of hydrogen gas compressed within the tanks 200. Thus, it becomes possible to suppress the possibility that noise caused by vibrations due to discharge of hydrogen gas may be perceived by a passenger of the vehicle.

When the door lock is not turned on (NO at step S327), the controller 300 decides whether or not an internal-pressure difference between a tank 200 having an opened opening/closing valve 210 and a tank 200 having a non-opened opening/closing valve 210 is equal to or more than a predetermined pressure value P1 (step S328). The term, predetermined pressure value P1, herein refers to a value indicating a lower limit of pressure difference at which when a tank 200 having a non-opened opening/closing valve 210 is opened, noise may be caused by a shock due to an internal-pressure difference between the tank 200 and another tank 200 having an already opened opening/closing valve 210.

When the pressure difference is equal to or more than the predetermined pressure value P1 (YES at step S328), the above-described step S330 is executed. Thereafter, the controller 300 ends the under-running valve-opening selection process. When the pressure difference is more than the pressure value P1, there is a possibility that noise may be caused by a shock due to the opening of a tank 200 having a non-opened opening/closing valve 210. Therefore, opening all of non-opened opening/closing valves 210 makes it possible to reduce the pressure difference less the noise caused by a shock grow so as to be perceivable for a passenger of the vehicle.

When the pressure difference is other than equal to or more than the predetermined pressure value P1 (NO at step S328), the controller 300 decides whether or not the secondary battery in the vehicle having the fuel cell system 10 mounted thereon is under charging (step S329).

When the secondary battery in the vehicle having the fuel cell system 10 mounted thereon is under charging (YES at step S329), the above-described step S330 is executed. Thereafter, the controller 300 ends the under-running valve-opening selection process. Opening opening/closing valves 210 concurrently with operating noise of the auxiliary machines operating for charging of the secondary battery makes it possible to counteract noise caused by vibrations due to discharge of hydrogen gas compressed in tanks 200. Thus, it becomes possible to suppress the possibility that noise caused by vibrations due to discharge of hydrogen gas may be perceived by a passenger of the vehicle.

When the secondary battery in the vehicle having the fuel cell system 10 mounted thereon is not under charging (NO at step S329), the controller 300 ends the under-running valve-opening selection process.

Reverting to FIG. 4, after the under-running valve-opening selection process is executed (after step S320), the controller 300 ends the selective valve-opening process.

According to the above-described first embodiment, upon a start-up of the fuel cell system 10, the opening/closing valve 210 having the longest total length of the merging flow path 230 and the supply flow path 220 ranging from the fastening position 250 of the fastening part 240 to the opening/closing valve 210 is opened, so that hydrogen gas is discharged from the tank 200 having the largest pressure loss within the range up to the fastening part 240 among the tanks 200. As a result of this, in comparison with a mode in which the opening/closing valve 210 having the longest total length is not opened and another opening/closing valve 210 is opened, the pressure of hydrogen gas can be reduced to a large extent in the course from the tank 200 to the fastening part 240, so that noise caused by vibrations due to discharge of hydrogen gas can be suppressed. Thus, it becomes possible to suppress the possibility that noise caused by vibrations due to discharge of hydrogen gas may be perceived by a passenger of the vehicle.

Also according to the first embodiment, upon a first-time start-up of the fuel cell system 10 since the last-time filling of hydrogen gas into the tanks 200, all the opening/closing valves 210 are opened; otherwise, upon a second- or further-time start-up of the fuel cell system 10 since the last-time filling of hydrogen gas into the tanks 200, the opening/closing valve 210 having the longest total length is opened. Therefore, damage to the opening/closing valves 210 can be suppressed. This will be described in detail below. In the case of a first-time start-up of the fuel cell system 10 since the last-time filling of hydrogen gas into the tanks 200, it is highly likely that the tanks 200 have been in a high-pressure state due to the filling of hydrogen gas. In such a state, by opening only an opening/closing valve or opening/closing valves 210 of some tanks 200 out of the tanks 200, it may occur that a closed opening/closing valve 210 is sandwiched, and damaged, between hydrogen gas discharged from within a high-pressure tank 200 and high-pressure hydrogen gas filled in a valve-closed tank 200. Therefore, all the opening/closing valves 210 are opened at the first-time start-up, by which such damage to opening/closing valves 210 can be suppressed.

Also according to the first embodiment, for opening of the opening/closing valve 210 having the longest total length, on condition that there exists an opening/closing valve 210 having a total-length difference of 100 mm or less from that of the opening/closing valve 210 having the longest total length out of non-opened opening/closing valves 210, the controller 300 opens the opening/closing valve 210 having a total-length difference of 100 mm or less. As a result of this, there can be opened an opening/closing valve 210 whose total-length difference from that of the opening/closing valve 210 having the longest total length is within a predetermined range, i.e., an opening/closing valve 210 of a tank 200 having a pressure loss comparable to that of a tank 200 having the largest pressure loss. Therefore, noise caused by vibrations due to discharge of hydrogen gas is suppressed as with the tank 200 having the largest pressure loss. Thus, it becomes possible to suppress the possibility that noise caused by vibrations due to discharge of hydrogen gas may be perceived by a passenger of the vehicle.

Also according to the first embodiment, in the case where the vehicle having the fuel cell system 10 mounted thereon is in a running-enabled state, and where at least one or more tanks 200 out of tanks 200 having non-opened opening/closing valves 210, respectively, have an internal pressure of the pressure value P4 or more, and still where electric power generated by the fuel cell stack 100 is equal to or more than the power value W1, the controller 300 opens the opening/closing valve 210 of a tank 200 having a non-opened opening/closing valve 210. Therefore, the opening/closing valve 210 can be opened so as to counteract operating noise of the auxiliary machines that operate while generating relatively large operating noise to allow the fuel cell system 10 to generate electric power of the power value W1 or more. Thus, it becomes possible to suppress the possibility that noise caused by vibrations due to discharge of hydrogen gas compressed in the tanks 200 may be perceived by a passenger of the vehicle.

Also according to the first embodiment, in the case where the vehicle having the fuel cell system 10 mounted thereon is in a running-enabled state, and where at least one or more tanks 200 out of tanks 200 having non-opened opening/closing valves 210, respectively, have an internal pressure of the pressure value P4 or more, and still where the vehicle speed of the vehicle is equal to or more than the vehicle speed value V1, the controller 300 opens opening/closing valves 210 of all of tanks 200 having non-opened opening/closing valves 210, respectively. Therefore, the opening/closing valves 210 can be opened so as to be counteracted by road noise and wind noise caused by the vehicle speed of the vehicle speed value V1 or more. Thus, it becomes possible to suppress the possibility that noise caused by vibrations due to discharge of hydrogen gas compressed in the tanks 200 may be perceived by a passenger of the vehicle.

B. Modifications

B1. Modification 1

In the fuel cell system 10 of the first embodiment, whether or not the fuel cell system 10 is at a start-up is decided depending on whether or not the fuel cell stack 100 is enabled to supply a predetermined electric power. However, the present disclosure is not limited to this. For example, the fuel cell system 10 may also be so arranged that whether or not the fuel cell system 10 is at a start-up is decided depending on whether or not a predetermined time has elapsed after a turn-on of the ignition switch provided in the vehicle having the fuel cell system 10 mounted thereon.

B2. Modification 2

In the fuel cell system 10 of the first embodiment, all the opening/closing valves 210 are opened when a start-up of the fuel cell system 10 is a first-time start-up since the last-time filling of hydrogen gas into the tanks 200. However, the present disclosure is not limited to this. For example, the fuel cell system 10 may also be so arranged that not all of the opening/closing valves 210 are opened but only the opening/closing valve 210 having the longest total length is opened when the start-up of the fuel cell system 10 is a first-time start-up since the last-time filling of hydrogen gas into the tanks 200.

B3. Modification 3

In the fuel cell system 10 of the first embodiment, candidate opening/closing valves are opened for opening of the opening/closing valve 210 having the longest total length. However, the present disclosure is not limited to this. For example, the fuel cell system 10 may also be so arranged that for opening of the opening/closing valve 210 having the longest total length, candidate opening/closing valves do not necessarily need to be opened even though a candidate opening/closing valve exists.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) In one aspect of the present disclosure, there is provided a vehicle with a fuel cell system mounted thereon. The fuel cell system includes: a fuel cell; a plurality of tanks for storing therein fuel gas to be used for power generation of the fuel cell, each tank having an opening/closing valve for switching over between execution and halt of supply of the fuel gas; a plurality of supply flow paths connected to the opening/closing valves in the plurality of tanks to feed the fuel gas supplied from the plurality of tanks, respectively; a merging flow path for merging together the plurality of supply flow paths to feed the fuel gas to the fuel cell; and a controller for controlling opening and closing of the opening/closing valves, wherein the merging flow path is fastened to a vehicle body of the vehicle, and at a start-up of the fuel cell system, the controller exerts such control as to open an opening/closing valve that is longest in total length out of the opening/closing valves in the plurality of tanks, the total length being a total sum of lengths of the merging flow path and the relevant supply flow path located within a range from a fastening position, at which the merging flow path is fastened to the vehicle body, to each opening/closing valve. According to this aspect, since the opening/closing valve that is longest in the total length of the merging flow path and the relevant supply flow path located within a range from the fastening position to each opening/closing valve is opened at a start-up of the fuel cell system, the fuel gas is discharged from the tank having the largest pressure loss of a range up to the fastening position out of the plurality of tanks. As a result of this, in comparison with a mode in which the opening/closing valve having the longest total length is not opened and another opening/closing valve is opened, the pressure of fuel gas can be reduced to a large extent in the course from the tank to the fastening position, so that noise caused by vibrations due to discharge of the fuel gas can be suppressed. Thus, it becomes possible to suppress the possibility that noise caused by vibrations due to discharge of fuel gas may be perceived by a passenger of the vehicle.

(2) In the foregoing aspect, the controller may exert such control including: at a start-up of the fuel cell system, given that the start-up is a first-time start-up since a last-time filling of the fuel gas into the plurality of tanks, opening all of the opening/closing valves in the plurality of tanks; and at a start-up of the fuel cell system, given that the start-up is a second-time start-up since a last-time filling of the fuel gas into the plurality of tanks, opening one opening/closing valve that is longest in the total length out of the plurality of the opening/closing valves. With this arrangement, damage to the opening/closing valves can be suppressed. This will be explained in detail below. When a start-up of the fuel cell system is a first-time start-up since the last-time filling of fuel gas into the tanks, it is highly likely that the tanks have come to a high-pressure state due to the fuel-gas filling. In such a state, opening an opening/closing valve or opening/closing valves of some of the plurality of tanks gives rise to a possibility that a closed opening/closing valve sandwiched between fuel gas discharged from within a high-pressure tank and high-pressure fuel gas filled within the closed tank may be damaged. Accordingly, such damage to the opening/closing valves can be suppressed by opening all the opening/closing valves at a first-time start-up.

(3) In the foregoing aspect, the controller may exert such control as to open an opening/closing valve longest in the total length, and thereafter open an opening/closing valve whose total-length difference from that of the opening/closing valve of the longest total length is within a predetermined range, out of non-opened opening/closing valves. With such an arrangement, there can be opened an opening/closing valve whose total-length difference from that of the opening/closing valve having the longest total length is within a predetermined range, i.e., an opening/closing valve of a tank having a pressure loss comparable to that of a tank having the largest pressure loss. Therefore, noise caused by vibrations due to discharge of fuel gas is suppressed as with the tank having the largest pressure loss. Thus, it becomes possible to suppress the possibility that noise caused by vibrations due to discharge of fuel gas may be perceived by a passenger of the vehicle.

(4) In the foregoing aspect, the fuel cell system may further include an auxiliary machine to be used for power generation of the fuel cell, wherein in a case where the vehicle is in a running-enabled state, and where an internal pressure of a tank with the opening/closing valve non-opened is equal to or more than a predetermined value, and still where electric power to be generated by the fuel cell is equal to or more than a predetermined first electric power, the controller may exert such control as to open the opening/closing valve of the tank with the opening/closing valve non-opened. With such an arrangement, the opening/closing valve can be opened so as to counteract operating noise of the auxiliary machine that operates while generating relatively large operating noise to allow the fuel cell to generate electric power of the predetermined first electric power or more. Thus, it becomes possible to suppress the possibility that noise caused by vibrations due to discharge of fuel gas compressed in the tanks may be perceived by a passenger of the vehicle.

(5) In the foregoing aspect, in a case where the vehicle is in a running-enabled state, and where an internal pressure of a tank with the opening/closing valve non-opened is equal to or more than a predetermined value, and still where a vehicle speed of the vehicle is equal to or more than a predetermined first vehicle speed, the controller may exert such control as to open the opening/closing valve of the tank with the opening/closing valve non-opened. With such an arrangement, the opening/closing valves can be opened so as to be counteracted by road noise and wind noise caused by the vehicle speed equal to or more than the predetermined first vehicle speed. Thus, it becomes possible to suppress the possibility that noise caused by vibrations due to discharge of fuel gas compressed in the tanks may be perceived by a passenger of the vehicle.

The present disclosure may be implemented in various modes other than fuel cell systems. For example, the disclosure may be implemented in modes such as a fuel-gas supply method for supply to a fuel cell in a fuel cell system to be mounted on a vehicle, a control device for executing this supply method, a computer program for implementing the supply method, a recording medium having the computer program recorded thereon, a mobile body with a fuel cell system mounted thereon, and the like.

What is claimed is:

1. A vehicle with a fuel cell system mounted thereon, the fuel cell system comprising:
   a fuel cell;
   a plurality of tanks configured to store fuel gas to be used for power generation of the fuel cell, each tank having an opening/closing valve for switching over between execution and halt of supply of the fuel gas;
   a plurality of supply flow paths connected to the opening/closing valves in the plurality of tanks, each supply flow path being configured to feed the fuel gas supplied from a respective one of the plurality of tanks;
   a merging flow path configured to merge together the plurality of supply flow paths to feed the fuel gas to the fuel cell;
   a fastening part situated at a fastening position and configured to fasten the merging flow path to a vehicle body of the vehicle; and
   a controller configured to control opening and closing of the opening/closing valves, wherein
   the merging flow path is fastened to the vehicle body at the fastening position, and
   at a start-up of the fuel cell system, the controller is configured to exert such control as to:
      select one of the opening/closing valves having a longest total flow path length out of the opening/closing valves, the total flow path length of each opening/closing valve being a sum of:
         a length of the supply flow path connected to the opening/closing valve, and
         a length of a portion of the merging flow path extending between the fastening position and a downstream end of the supply flow path that is connected to the opening/closing valve; and
      open the one of the opening/closing valves having the longest total flow path length.

2. A vehicle with a fuel cell system mounted thereon, the fuel cell system comprising:
   a fuel cell;
   a plurality of tanks configured to store fuel gas to be used for power generation of the fuel cell, each tank having an opening/closing valve for switching over between execution and halt of supply of the fuel gas;
   a plurality of supply flow paths connected to the opening/closing valves in the plurality of tanks, each supply flow path being configured to feed the fuel gas supplied from a respective one of the plurality of tanks;
   a merging flow path configured to merge together the plurality of supply flow paths to feed the fuel gas to the fuel cell; and
   a controller configured to control opening and closing of the opening/closing valves, wherein
   the merging flow path is fastened to a vehicle body of the vehicle at a fastening position, and
   at a start-up of the fuel cell system, the controller is configured to exert such control as to:
      select one of the opening/closing valves having a longest total flow path length out of the opening/closing valves, the total flow path length of each opening/closing valve being a sum of:
         a length of the supply flow path connected to the opening/closing valve, and
         a length of a portion of the merging flow path extending between the fastening position and a downstream end of the supply flow path that is connected to the opening/closing valve;
      given that the start-up is a first-time start-up since a last-time filling of the fuel gas into the plurality of tanks, open all of the opening/closing valves in the plurality of tanks; and
      given that the start-up is a second-time start-up since the last-time filling of the fuel gas into the plurality of tanks, open the one of the opening/closing valves having the longest total flow path length out of the plurality of the opening/closing valves.

3. The vehicle in accordance with claim 1, wherein after opening the one of the opening/closing valves having the longest total flow path length, the controller is configured to exert such control as to:
   determine, for each closed opening/closing valve, a total flow path length difference that is a difference between the total flow path length of the closed opening/closing valve and the total flow path length of the one of the opening/closing valves having the longest total flow path length, and
   thereafter open one of the closed opening/closing valves whose total flow path length difference is equal to or less than a predetermined total flow path length difference value.

* * * * *